March 19, 1946.   G. R. GILKEY   2,397,000
RESEATING TOOL FOR VALVE BODIES
Filed April 17, 1944   2 Sheets-Sheet 1

Inventor
GUY R. GILKEY
By Herbert E. Smith
Attorney

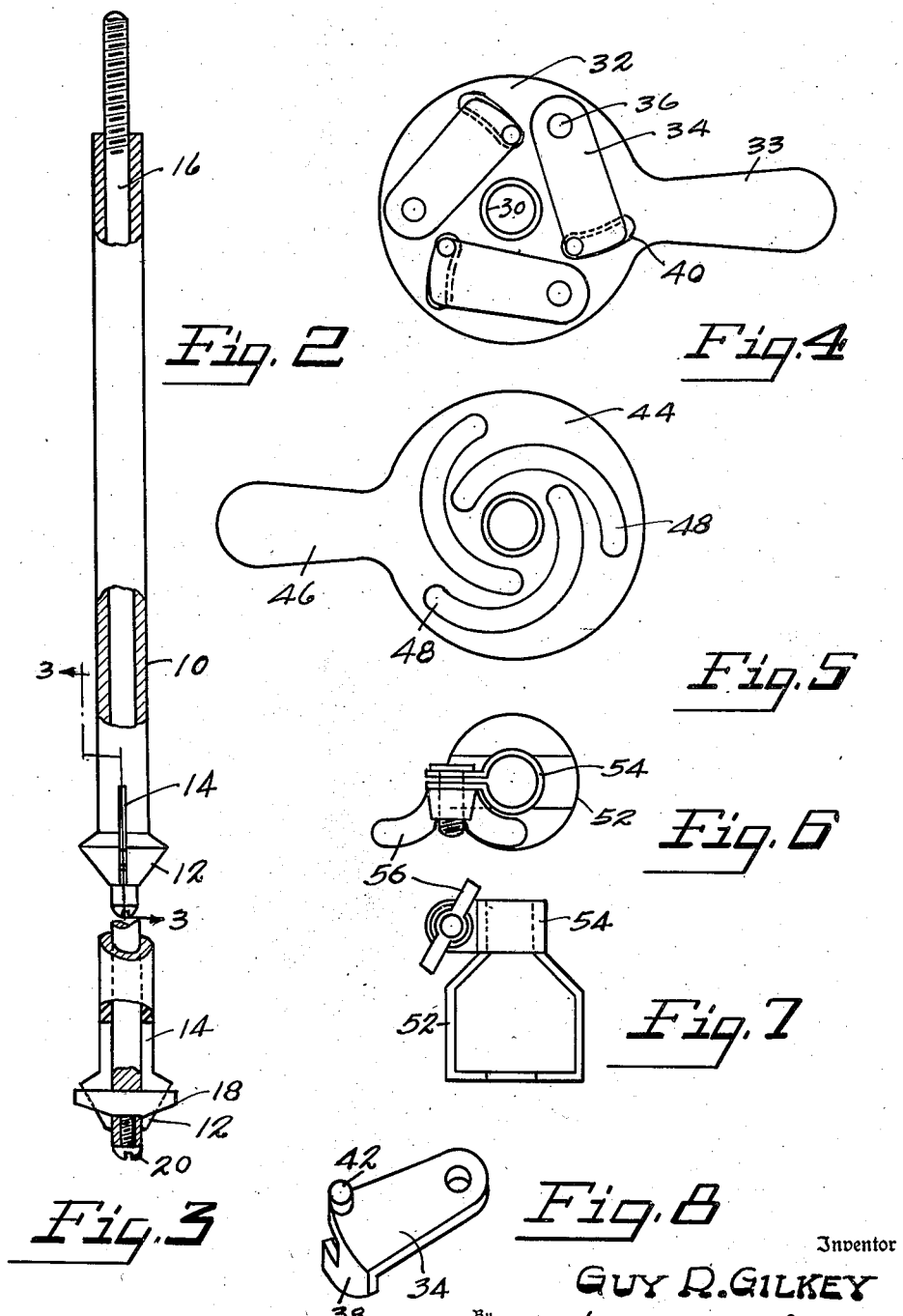

Patented Mar. 19, 1946

2,397,000

UNITED STATES PATENT OFFICE 2,397,000

RESEATING TOOL FOR VALVE BODIES

Guy R. Gilkey, Spokane, Wash., assignor of one-half to George Furler, Metaline Falls, Wash.

Application April 17, 1944, Serial No. 531,524

2 Claims. (Cl. 90—12.5)

This invention relates to a reseating tool for valve bodies of the type commonly used for controlling the passage of fluids through conduit systems, and, more particularly, for refinishing the valve seat of faucets, globe valve, and similar devices in which the valve seat is positioned in alinement with a normally closed opening through which the valve stem is inserted and with respect to which the same operates.

A prime defect of the prior art devices is that while means have been provided for securing the valve reseating tool to the valve body, the only additional alining means employable is that of bringing the cutters into engagement with the surface being reseated with a result that, as a cut is taken, that end of the spindle carrying the cutter destroys the alinement previously attained and therefore such alinement depends on the great skill of the user. A further defect in the prior art lies in the complexity of the means employed for attaching the spindle to the valve body and is also due to the great amount of time employed in making such an attachment.

It is an important object of this invention to provide a valve reseating tool which has a spindle that is at all times properly alined with the valve seat being refinished and the valve body thereof irrespective of whether the cutter is in cutting engagement or not.

Another object of my invention lies in the provision of a reseating tool for valve bodies which has a cutter movable relative the spindle which carries it.

Still another object of the invention lies in the provision, in a tool of the type described, of a cutter that is movable from a point remote from said cutter and which may be moved during a cutting operation.

The foregoing objects and other ancillary thereto I prefer to accomplish as follows:

According to a preferred embodiment of my invention I provide a spindle having a centering cone adjacent one end and means for rotating the spindle at a point remote thereto. A cutter is carried by the spindle for rotation therewith and is mounted in the spindle for movement longitudinally thereof, means being provided remote from said cutter and operable for moving the same respective said spindle to advance it or retract it from the work. Clamping means, which may be cam operated, are also carried by said spindle and are engageable with the body of a valve member being reseated to aline the spindle relative thereto. Said clamp means may be selectively positioned on said spindle to accommodate valve bodies in which the valve seats have a wide variety of spacing from the usual opening through which the valve stem is inserted into the valve body for securing by the usual packing means; i. e. a packing gland or the like.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which Figure 1 is a view in elevation of my tool for reseating valve bodies illustrating in sections such a valve body;

Figure 2 is a view of the spindle of my valve reseating tool, with portions shown in section for convenience in illustration;

Figure 3 is a view taken on line 3, 3 of Figure 2;

Figure 4 is a plan view of the jaw carrying member of the clamp means employed in securing a spindle within a valve body;

Figure 5 is a plan view of the cam actuating means for the jaws of the device of Figure 4;

Figures 6 and 7 are plan and elevation views respectively of a clamping yoke employed in my valve reseating tool; and Figure 8 is a perspective view of a clamping jaw of my tool.

Figure 1:
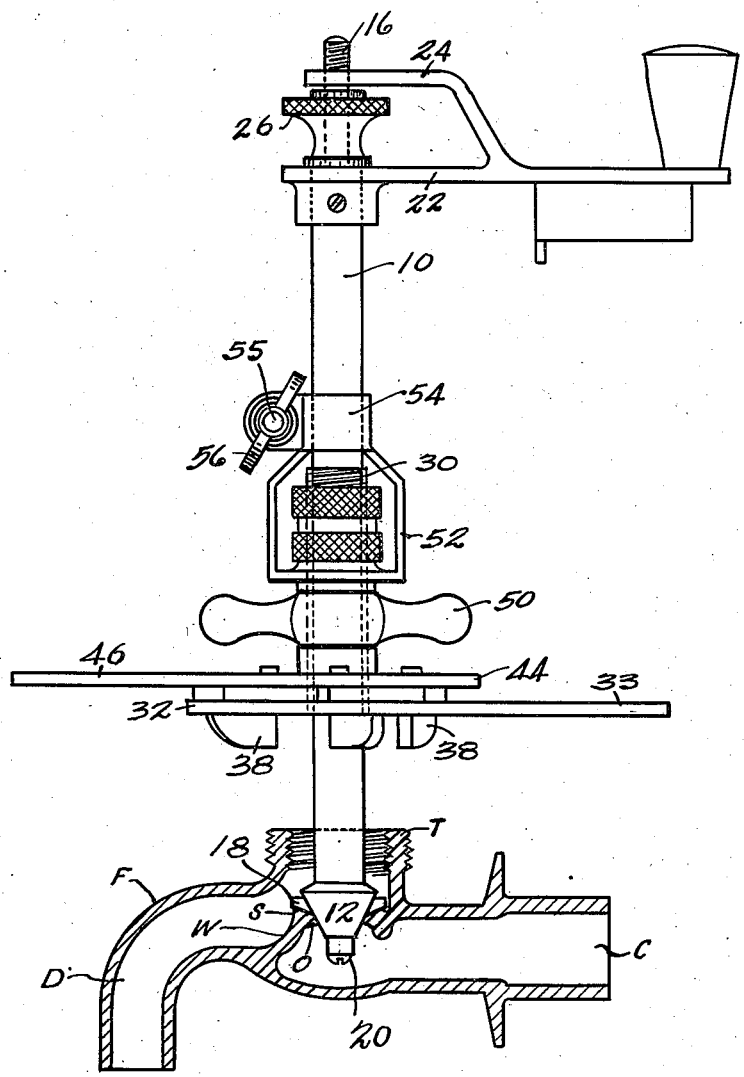

A reseating tool for valve bodies to overcome the defects hereinbefore enumerated must have at least two totally distinct characteristics; it must be capable of positive alinement with respect to a valve seat for the production of an accurate reseating operation; and it must also provide a cutter that can be delicately advanced into a valve seat without destroying a previously attained alinement. Accordingly, a preferred embodiment of my invention, referring to Figure 1 of the drawings, constitutes a spindle, a portion of which is insertible into a valve body to position a cutter for refinishing the seat of said valve bodies. The reference letter F designates a conventional faucet having a seat S located between the inlet conduit C and the discharge conduit D in the web W through which is formed the opening O. The seat S surrounds one side of said opening O and is accessible from exterior of the faucet F through the usual threaded sleeve T which accommodates the valve stem (not shown) and is closed by a conventional gland.

My tool employs a hollow or tubular spindle 10 which has a cone 12 at one end. The spindle is slotted at 14 from the end adjacent the cone inward. A bolt 16, longitudinally movable, is mounted within the spindle 10 and has a laterally disposed wing cutter 18 at that end adjacent the cone 12. The cutter is secured in place by a screw 20 as shown in Figure 3. The wings of the cutter are disposed in the slot 14 so that when the bolt 16 is moved longitudinally of the spindle the cutter 18 may also move.

A crank 22 is secured to the end of the spindle opposite the cone and is employable for rotating the spindle. An offset arm 24 on the crank arm forms a yoke which engages around the end of bolt 16 at its outer end. A nut 26 is threadably engaged on the bolt between the arms 22 and 24 and, when rotated, retracts or extends the bolt 16 longitudinally in the spindle 10.

A sleeve 30 is slidably mounted upon the spindle 10 and, on its lower end, carries fixed clamp plate 32 having a handle 33. A plurality of jaw arms 34 are pivoted at 36 to the plate 32 and downwardly extending jaws 38 on the arms 34 pass through slots 40 of the plate 32. Each arm 34 has an upstanding pin 42.

Superimposed upon the plate 32 and the arms 34 is a cam plate 44 having a handle 46. Plate 44 is rotatable about the axis of the spindle 30 relative plate 32. Camming slots 48 in the plate 44, spirally positioned with respect to the axis thereof, engage over the pins 42 so that when plate 44 is rotated relative plate 32 pressure will be applied to the pins 42 and the arms and jaws to which they are attached will either close or open. A wing nut 50, threadably engaged on the sleeve 30, is useful for clamping the plates 32 and 44 together in an adjusted position upon a valve body. The yoke 52 encircles the sleeve 30 at one end and has a clamp 54 encircling the spindle 10 above the end of the sleeve 30. Clamp 54 is tightened on the spindle 10 by means of the bolt 55 and the wing nut 56.

When the valve reseating tool is properly positioned on a faucet, turning movement of the crank 22 will cause the spindle to rotate in its centered position in the opening O and within the sleeve 30. The cutter 18 will also rotate but will only cut at such time as it is advanced into contact with the seat S. This advancement of the cutter 18 is obtained by turning the nut 26 and thus causing bolt 16 to move inward longitudinally of the spindle 10. It will be apparent that at all times the spindle 10 is properly alined in the opening O, irrespective of whether cutting is obtained or not and that even though the seat S is cut slightly there will be no disalining of the cutter 18.

Having thus described my invention, I claim:

1. In a valve seating tool of the type having a rotatable spindle provided with valve seat centering means on one end and a cutter operable upon a valve seat with relation to which the spindle is centered, a centering clamp for valve bodies, comprising: a sleeve slidable upon said spindle, clamp means for locking said sleeve to said spindle against longitudinal movement but without hindrance to independent co-axial rotation of the sleeve and spindle, a plate fixed to said sleeve, clamp arms pivoted to said fixed plate and having jaws each provided with a cam follower boss, a second plate rotatable on said sleeve and superpositioned relative said fixed plate, camming surfaces on said second plate and cooperable with the cam follower bosses of said clamp arms and operable upon rotation of said second plate to move said clamp arms, said clamp arms being engageable to a valve body adjacent the valve seat to be tooled and a clamp nut threaded on said sleeve adjacent the second plate and operable to clamp the same and the clamp arms to said fixed plate.

2. In a valve seating tool of the type having a rotatable spindle provided with valve seat centering means on one end and a cutter operable upon a valve seat with relation to which the spindle is centered, a centering clamp for valve bodies, comprising: a sleeve slidable upon said spindle, clamp means for locking said sleeve to said spindle against longitudinal movement but without hindrance to independent co-axial rotation of the sleeve and spindle, a plate fixed to said sleeve, clamp arms pivoted to said fixed plate and having jaws extending below said fixed plate, a second plate rotatable about said sleeve and superpositioned relative said fixed plate, camming means between said second plate and said clamp arms and operable upon rotation of said second plate to move said clamp arms, said clamp jaws below said fixed plate being engageable to a valve body adjacent the valve seat to be tooled, and a clamp nut threaded on said sleeve adjacent the second plate and operable to clamp the same and the clamp arms to said fixed plate.

GUY R. GILKEY.